(12) United States Patent
Kim et al.

(10) Patent No.: US 11,467,449 B2
(45) Date of Patent: Oct. 11, 2022

(54) LIQUID CRYSTAL DISPLAY DEVICE

(71) Applicant: LG CHEM, LTD., Seoul (KR)

(72) Inventors: Young Jin Kim, Daejeon (KR); Kyun Do Park, Daejeon (KR); Dae Hee Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 22 days.

(21) Appl. No.: 17/047,376

(22) PCT Filed: Jun. 3, 2019

(86) PCT No.: PCT/KR2019/006638
§ 371 (c)(1),
(2) Date: Oct. 13, 2020

(87) PCT Pub. No.: WO2019/231301
PCT Pub. Date: Dec. 5, 2019

(65) Prior Publication Data
US 2021/0116761 A1    Apr. 22, 2021

(30) Foreign Application Priority Data
Jun. 1, 2018    (KR) .................. 10-2018-0063443

(51) Int. Cl.
*G02F 1/13363* (2006.01)
*G02F 1/1335* (2006.01)
*G02F 1/1343* (2006.01)

(52) U.S. Cl.
CPC .. *G02F 1/133634* (2013.01); *G02F 1/133531* (2021.01); *G02F 1/134363* (2013.01);
(Continued)

(58) Field of Classification Search
CPC ......... G02F 1/134363; G02F 1/134372; G02F 2413/06
See application file for complete search history.

(56) References Cited

U.S. PATENT DOCUMENTS 7,511,792 B2    3/2009    Chang et al.
7,633,582 B2    12/2009    Lin et al.
(Continued)

FOREIGN PATENT DOCUMENTS

JP    2006-330268 A    12/2006
JP    2007-147884 A    6/2007
(Continued)

OTHER PUBLICATIONS

International Search Report and the Written Opinion of PCT/KR2019/006638, dated Sep. 5, 2019.
(Continued)

*Primary Examiner* — Alexander P Gross
(74) *Attorney, Agent, or Firm* — Dentons US LLP

(57) ABSTRACT

Provided is a liquid crystal display device, comprising an upper polarizer, an in-plane switching mode liquid crystal panel, and a lower polarizer. The in-plane switching mode liquid crystal panel comprises a liquid crystal layer having a Rin (550) value in a range of 310 nm to 350 nm. An absorption axis of the upper polarizer and an absorption axis of the lower polarizer are orthogonal. The lower polarizer is adjacent to a light source as compared to the upper polarizer. The liquid crystal display further comprises, as retardation films, a positive biaxial retardation film having a Rin (450)/Rin (550) value in a range of 0.99 to 1.01, and a negative C plate between the upper polarizer and the in-plane switching mode liquid crystal panel.

12 Claims, 3 Drawing Sheets

(52) U.S. Cl.
CPC ...... *G02F 2413/02* (2013.01); *G02F 2413/06* (2013.01); *G02F 2413/12* (2013.01)

(56) References Cited

U.S. PATENT DOCUMENTS

| | | | |
|---|---|---|---|
| 8,243,239 B2 | 8/2012 | Choi et al. | |
| 8,421,965 B2 | 4/2013 | Maezawa et al. | |
| 9,436,038 B2 | 9/2016 | Lee et al. | |
| 9,500,788 B2 | 11/2016 | Jeon et al. | |
| 9,651,819 B2 | 5/2017 | Chang et al. | |
| 2010/0020279 A1* | 1/2010 | Nagase | G02F 1/133634 349/118 |
| 2010/0157207 A1 | 6/2010 | Lee et al. | |
| 2014/0293198 A1* | 10/2014 | Iwasaki | G02F 1/134363 349/96 |
| 2016/0291373 A1* | 10/2016 | Iida | G02F 1/13363 |

FOREIGN PATENT DOCUMENTS

| | | |
|---|---|---|
| JP | 2009-037209 | 2/2009 |
| JP | 2011-039176 A | 2/2011 |
| JP | 2013-238770 A | 11/2013 |
| JP | 2015-031822 A | 2/2015 |
| KR | 10-0767210 | 10/2007 |
| KR | 10-2010-0025171 | 3/2010 |
| KR | 10-2010-0060091 | 6/2010 |
| KR | 10-2010-0076892 | 7/2010 |
| KR | 10-2010-0080033 | 7/2010 |
| KR | 10-1112114 | 2/2012 |
| KR | 10-2013-0070559 | 6/2013 |
| KR | 10-2013-0073149 | 7/2013 |
| KR | 10-1525996 | 6/2015 |
| TW | I251103 | 3/2006 |
| TW | I546576 | 8/2016 |
| WO | 2010-110549 | 9/2010 |
| WO | 2019 017483 A1 | 1/2019 |

OTHER PUBLICATIONS

Office Action of Korean Patent Office in Appl'n No. 10-2019-0065206, dated Mar. 16, 2020.
Office Action of Taiwanese Patent Office in Appl'n No. 108119157, dated Jun. 3, 2019.

* cited by examiner

Figure 1

| | |
|---|---|
| 10 | |
| 40 | |
| 50 | |
| 20 | |
| 30 | | ered herein by reference in its entirety.

LIQUID CRYSTAL DISPLAY DEVICE

CROSS-REFERENCE TO RELATED APPLICATIONS

This application is a National Stage Application of International Application No. PCT/KR2019/006638 filed on Jun. 3, 2019, which claims priority to Korean Patent Application No. 10-2018-0063443 filed on Jun. 1, 2018, the disclosure of which is incorporated herein by reference in its entirety.

TECHNICAL FIELD

This application relates to a liquid crystal display device.

BACKGROUND

An IPS mode LCD (in-plane switching liquid crystal display) refers to an LCD in which the initial liquid crystal orientation is horizontal to a glass substrate and liquid crystals are oriented to have a certain angle with respect to an electrode, and an electric field direction is formed parallel to the glass substrate. Conventional viewing angle compensation films used in IPS mode LCDs have been generally used to make colors of polarizing plates bluish, but it is also an important issue in the future to improve contrast ratios in viewing angles as well as colors using the viewing angle compensation films (Korean Laid-Open Patent Publication No. 10-2010-0076892).

DISCLOSURE

Technical Problem

The present application provides an in-plane switching mode liquid crystal display device having excellent contrast ratios as well as colors in viewing angles.

Technical Solution

The present application relates to a liquid crystal display device. FIG. 1 exemplarily shows a liquid crystal display device of the present application. As shown in FIG. 1, the liquid crystal display device of the present application can comprise an upper polarizer (10), an in-plane switching mode liquid crystal panel (20), and a lower polarizer (30) sequentially. The liquid crystal display device of the present application can comprise a positive biaxial retardation film (40) and a negative C plate (50) as retardation films between the upper polarizer (10) and the in-plane switching mode liquid crystal panel (20). In the present application, it is possible to provide an in-plane switching mode liquid crystal display device having excellent contrast ratios as well as colors in viewing angles by controlling wavelength dispersibility of the positive biaxial retardation film with flat dispersibility. Hereinafter, the liquid crystal display device of the present application will be described in detail.

In this specification, the term upper can mean, when a display device implements images, a direction from the display device to an observer observing the images, and the term lower can mean the opposite direction. The upper polarizer can also be referred to, in another term, as a viewer-side polarizer. Furthermore, in this specification, the term lower polarizer can also be referred to as a back-side polarizer or a light-source-side polarizer.

In this specification, the terms, polarizer and polarizing plate, refer to objects that are distinguishable from each other. The term polarizer means a film, sheet or element itself having a polarizing function, and the term polarizing plate means an object comprising the polarizer and another element laminated on one or both sides of the polarizer. Here, as another element, a protective film of a polarizer, a pressure-sensitive adhesive layer, an adhesive layer, a retardation film or a low reflection layer, and the like can be exemplified.

As the protective film which can be contained in the polarizing plate, a film of a known material can be used. As such a material, for example, a thermoplastic resin having excellent transparency, mechanical strength, thermal stability, moisture barrier property or isotropy, and the like can be used. An example of such a resin can be exemplified by a cellulose resin such as triacetyl cellulose (TAC), a polyester resin, a polyethersulfone resin, a polysulfone resin, a polycarbonate resin, a polyamide resin, a polyimide resin, a polyolefin resin, a (meth)acrylic resin, a cyclic polyolefin resin such as a norbornene resin, a polyarylate resin, a polystyrene resin, a polyvinyl alcohol resin or a mixture thereof, and the like.

As the protective film, an optically anisotropic film with a retardation value or an optically isotropic film without any retardation value can be used. In one example, as the protective film, an isotropic film can be used.

The protective film can be present on one side or both sides of the polarizer, and when present on both sides, the respective protective films can be the same or different.

In one example, a positive biaxial retardation film and a negative biaxial retardation film can be sequentially formed on one side of the upper polarizer. At this time, a protective film may or may not be present between the upper polarizer and the positive biaxial retardation film. When a protective film is present, the protective film can be a protective film without any retardation value.

The polarizer is a functional element capable of extracting light that vibrates in one direction from incident light that vibrates in various directions. As the polarizer, for example, a known absorption linear polarizer can be used. As such a polarizer, a PVA (poly(vinyl alcohol)) polarizer can be exemplified. In one example, the polarizer can be a PVA film or sheet that a dichroic dye or iodine is adsorbed and oriented. The PVA can be obtained by, for example, gelling polyvinyl acetate. The polyvinyl acetate can be exemplified by a homopolymer of vinyl acetate; and a copolymer of vinyl acetate and another monomer, and the like. Here, another monomer copolymerized with vinyl acetate can be exemplified by one or two or more of an unsaturated carboxylic acid compound, an olefin compound, a vinyl ether compound, an unsaturated sulfonic acid compound and an acrylamide compound having an ammonium group, and the like. The polyvinyl acetate has generally a gelation degree of about 85 mol % to about 100 mol % or 98 mol % to 100 mol % or so. The polyvinyl alcohol in the linear polarizer can generally have a polymerization degree of about 1,000 to about 10,000 or about 1,500 to about 5,000.

In this specification, the retardation film can mean an element capable of converting incident polarized light by controlling birefringence as an optically anisotropic layer. In this specification, when x-, y- and z-axes of the retardation film are described, the x-axis means the direction parallel to the in-plane slow axis of the retardation film, the y-axis means the direction parallel to the in-plane fast axis of the retardation film, and the z axis means the thickness direction of the retardation film, unless otherwise specified. The x-axis and the y-axis can be orthogonal to each other in the plane. In this specification, when the retardation film comprises rod-shaped liquid crystal molecules, the slow axis can mean the long axis direction of the rod shape, and when the retardation film comprises disk-shaped liquid crystal molecules, the slow axis can mean the normal direction of the disk shape. In this specification, when an optical axis of the retardation film is described, it means a slow axis, unless otherwise specified. In this specification, when a refractive index of the retardation film is described, it means a refractive index for light having a wavelength of about 550 nm, unless otherwise specified.

In this specification, when the term such as vertical, horizontal, orthogonal or parallel is used while defining an angle, it means substantially vertical, horizontal, orthogonal, or parallel to the extent that the desired effect is not impaired, which includes, for example, an error that takes a production error or a deviation (variation), and the like, into account. For example, each case of the foregoing can include an error within about ±15 degrees, an error within about ±10 degrees or an error within about ±5 degrees.

In this specification, the in-plane retardation (Rin) and the thickness direction retardation (Rth) of the retardation film or a liquid crystal layer are calculated by the following equations 1 and 2, respectively. In this specification, Rin ($\lambda$) means an in-plane retardation value of a liquid crystal layer or a retardation film for a wavelength of $\lambda$nm, and Rth ($\lambda$) means a thickness direction retardation value of a liquid crystal layer or a retardation film for a wavelength of $\lambda$nm.

$$Rin=(nx-ny) \times d \qquad \text{Equation 1}$$

$$Rth=\{(nx+ny)/2-nz\} \times d \qquad \text{Equation 2}$$

In Equations 1 to 2, d is the thickness of the retardation film or the liquid crystal layer, and nx, ny and nz are the refractive indexes of the retardation film or the liquid crystal layer in the x-, y- and z-axis directions, respectively. The x-axis means the direction parallel to the in-plane slow axis of the retardation film or the liquid crystal layer, the y-axis means the direction parallel to the in-plane fast axis of the retardation film or the liquid crystal layer, and the z-axis means the thickness direction of the retardation film or the liquid crystal layer. In this specification, when an in-plane retardation value and a thickness direction retardation value of a retardation film or a liquid crystal layer are described, they mean retardation values for light having a wavelength of about 550 nm, unless otherwise specified.

In this specification, an Nz value of the retardation film can be calculated by the following Equation 3:

$$Nz=(nx-nz)/(nx-ny) \qquad \text{Equation 3}$$

In Equation 3, nx, ny and nz are the refractive indexes of the retardation film in the x-axis, y-axis and z-axis directions as defined above, respectively.

In this specification, the positive biaxial retardation film means a retardation film satisfying the following equation 4, which can be called a so-called +B plate. In one example, the positive biaxial retardation film can satisfy nz>nx or satisfy nx>nz while satisfying the following equation 4. In one example, when nz>nx is satisfied, the Nz value can be a negative number of less than 0. In another example, when nx>nz is satisfied, the Nz value can be more than 0 to less than 1.

In this specification, the negative C plate can mean a retardation film satisfying the following equation 5. Since the negative C plate is nx=ny, the Nz value is undefined or has an infinite ($\infty$) value.

$$nz \neq nx > ny \qquad \text{Equation 4}$$

$$nx=ny>nz \qquad \text{Equation 5}$$

In one example, the absorption axis of the upper polarizer and the absorption axis of the lower polarizer can be orthogonal. In one example, the lower polarizer can be disposed closer to a light source side than the upper polarizer. Therefore, the positive biaxial retardation film and the negative C plate disposed between the upper polarizer and the liquid crystal panel can perform compensation for the light that has passed through a liquid crystal panel. As described below, the liquid crystal panel can comprise a liquid crystal layer between the upper substrate and the lower substrate. At this time, a retardation value difference can occur between the upper substrate and the lower substrate depending on the structure of the upper substrate and the lower substrate. If a positive biaxial retardation film and a negative C plate are disposed between the lower polarizer and the liquid crystal panel to compensate for the light before passing through the liquid crystal panel, the compensation point can be changed while passing through the liquid crystal panel due to the retardation value difference, and thus it is difficult to maximize the effect of improving the contrast ratio in the viewing angle even if the positive biaxial retardation film with flat dispersibility is used. In the present invention, the compensation is performed after passing through the liquid crystal panel by disposing the retardation film between the upper polarizer and the liquid crystal panel, so that the compensation path can be set to the target compensation point at the linearly polarized light position, where it is possible to maximize the effect of improving the contrast ratio in the viewing angle by controlling the wavelength dispersibility of the positive biaxial retardation film to the flat dispersibility.

The positive biaxial retardation film can have flat dispersibility. The flat dispersibility can mean the following retardation value characteristics. The positive biaxial retardation film can have a Rin (450)/Rin (550) value in a range of 0.99 to 1.01. The positive biaxial retardation film can have a Rin (650)/Rin (550) value in a range of 0.99 to 1.01. When the positive biaxial retardation film having flat dispersibility is used, a bluish color can be exhibited at a viewing angle, and a contrast ratio at a viewing angle can also be improved.

In one example, the positive biaxial retardation film can have an in-plane retardation value of more than 0 nm to 300 nm or less for light having a wavelength of 550 nm. The in-plane retardation value can be, specifically, from more than 0 nm, 50 nm or more, 80 nm or more, 100 nm or more, or 110 nm or more, to 300 nm or less, 250 nm or less, 200 nm or less, 150 nm or less, or 120 nm or less. Within such a retardation value range, it can be advantageous to provide an in-plane switching mode liquid crystal display device having excellent contrast ratios as well as colors in viewing angles.

In one example, the positive biaxial retardation film can have a thickness direction retardation value of −300 nm to −40 nm. The thickness direction retardation value can be, specifically, from −300 nm or more, −170 nm or more, −130 nm or more, or −120 nm or more, to −40 nm or less, −90 nm or less, or −100 nm or less. Within such a retardation value range, it can be advantageous to provide an in-plane switching mode liquid crystal display device having excellent contrast ratios as well as colors in viewing angles.

In one example, the Nz value of the positive biaxial retardation film in Equation 3 above can be less than 1. At this time, the case where the Nz value is 0 can be excluded. Accordingly, the Nz value can be less than 0, or more than 0 to less than 1. The Nz value can be, specifically, −1 or more, or −0.5 or more, and can be 0.5 or less, or less than 0. Within such an Nz value range, it can be advantageous to provide an in-plane switching mode liquid crystal display device having excellent contrast ratios as well as colors in viewing angles.

In one example, the slow axis of the positive biaxial retardation film can be parallel to the absorption axis of the upper polarizer. If the slow axis of the positive biaxial film and the absorption axis of the upper polarizer are not parallel to each other, a light leakage phenomenon can occur due to light projection between the lower polarizer and the upper polarizer on the optical path.

In one example, the positive biaxial retardation film can be disposed adjacent to the upper polarizer over the negative C plate. Through this arrangement, it can be advantageous to provide an in-plane switching mode liquid crystal display device having excellent colors and contrast ratios in viewing angles.

In one example, the negative C plate can have a thickness direction retardation value of 40 nm to 130 nm. Specifically, the thickness direction retardation value can be from 40 nm or more, 50 nm or more, 70 nm or more, 90 nm or more, 100 nm or more, or 110 nm or more, to 130 nm or less, or 120 nm or less. Within such a retardation value range, it can be advantageous to provide an in-plane switching mode liquid crystal display device having excellent contrast ratios as well as colors in viewing angles.

The thickness of the negative C plate can be in a range of 0.5 μm to 30 μm. The thickness of the entire retardation film including the positive biaxial film and the negative C plate can be in the range of 20 μm to 100 μm.

The positive biaxial retardation film can be a polymer stretched film or a liquid crystal polymerized film. The polymer stretched film can comprise a stretched polymer layer obtained by stretching a polymer film, which is capable of imparting optical anisotropy by stretching, in a suitable manner. The liquid crystal polymerized film can comprise a liquid crystal polymer layer or a cured layer of a polymerizable liquid crystal compound.

Here, as the polymer stretched film, for example, a polymer layer comprising a polyolefin such as polyethylene or polypropylene, a cycloolefin polymer (COP) such as polynorbornene, polyvinyl chloride, polyacrylonitrile, polysulfone, an acrylic resin, polycarbonate, a polyester such as polyethylene terephthalate, polyacrylate, polyvinyl alcohol, a cellulose ester polymer such as TAC (triacetyl cellulose), a copolymer of two or more monomers among the monomers forming the polymer, and the like can be used.

In one example, the positive biaxial retardation film can comprise an acrylate-based resin. As described below, the retardation film can be produced by a method of film-forming a resin composition and stretching it. Therefore, the resin composition for producing a positive biaxial retardation film can comprise an acrylate resin.

In one example, the acrylate-based resin can have a glass transition temperature (Tg) of 120° C. or more. The glass transition temperature of the acrylate-based resin can be, specifically, 120° C. or more, or 125° C. or more, and can be 150° C. or less, or 145° C. or less. In this specification, the glass transition temperature has been measured using DSC (differential scanning calorimeter) equipment from METTLER Co., and the measuring method includes steps of placing 3 mg to 20 mg of a resin to be measured in an aluminum crucible, melting the resin from 30° C. to 250° C. at a heating rate of 10° C. per minute, and cooling the resin again to 30° C. and then melting it again at a heating rate of 10° C. per minute up to 200° C. At this time, through the DSC equipment from METTLER Co., the midpoint of the temperature range where the specific heat behavior of the resin changes during the second melting process is measured, and this value is measured as the glass transition temperature value.

In one example, the acrylate-based resin can comprise a (meth)acrylate-based resin having a weight average molecular weight of 100,000 g/mol to 5,000,000 g/mol. The weight average molecular weight can be measured by a gel permeation chromatography (GPC) analysis.

In this specification, the (meth)acrylate has a meaning to include both acrylate and methacrylate. The (meth)acrylate-based resin can be, for example, a copolymer of a (meth)acrylic acid ester-based monomer and a crosslinkable functional group-containing monomer.

The (meth)acrylic acid ester-based monomer is not particularly limited, but can include, for example, alkyl (meth)acrylates, and more specifically, can include, as a monomer having an alkyl group with 1 to 12 carbon atoms, one or two or more of pentyl (meth)acrylate, n-butyl (meth)acrylate, ethyl (meth)acrylate, methyl (meth)acrylate, hexyl (meth)acrylate, n-octyl (meth)acrylate, isooctyl (meth)acrylate, 2-ethylhexyl (meth)acrylate, dodecyl (meth)acrylate and decyl (meth)acrylate.

The crosslinkable functional group-containing monomer is not particularly limited, but can include, for example, one or two or more of a hydroxyl group-containing monomer, a carboxyl group-containing monomer and a nitrogen-containing monomer.

An example of the hydroxyl group-containing compound can include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate or 2-hydroxypropylene glycol (meth)acrylate, and the like.

An example of the carboxyl group-containing compound can include (meth)acrylic acid, 2-(meth)acryloyloxyacetic acid, 3-(meth)acryloyloxypropionic acid, 4-(meth)acryloyloxybutyric acid, an acrylic acid dimer, itaconic acid, maleic acid or maleic anhydride, and the like.

An example of the nitrogen-containing monomer can include (meth)acrylonitrile, N-vinylpyrrolidone or N-vinylcaprolactam, and the like.

From the viewpoint of improvement of other function properties such as compatibility, the (meth)acrylate-based resin can be further copolymerized with at least one of vinyl acetate, styrene and acrylonitrile.

In one example, the acrylate-based resin can have one or more monomers selected from the group consisting of an N-substituted maleimide structure, a lactone ring structure and a glutarimide structure in an acrylate molecular chain. In the acrylate-based resin, the N-substituted maleimide structure, the lactone ring structure and the glutarimide structure can be confirmed by nuclear magnetic resonance (NMR) measurement. In one example, the N-substituted maleimide structure can be N-phenylmaleimide (PMI).

The presence of the monomer in the acrylate molecular chain means that 1 to 40 parts by weight, preferably 5 to 30 parts by weight, more preferably 5 to 20 parts by weight of the monomer is contained based on 100 parts by weight of the acrylic resin, and when the monomer is contained in the acrylate molecular chain, a copolymer can be formed.

In the copolymer, a product obtained by polymerizing two or more different units is referred to as a copolymer, where two or more units can be arranged irregularly or regularly. The copolymer can include a random copolymer having a form that monomers are randomly mixed with each other, a block copolymer that the blocks arranged in a predetermined section are repeated or an alternating copolymer having a form that monomers are alternately repeated and polymerized, and the acrylate-based resin according to one embodiment of the present application can be a random copolymer, a block copolymer or an alternating copolymer.

In one example, the acrylate-based resin can be a lactone-methyl methacrylate (Lactone-MMA), maleimide-methyl methacrylate (Maleimide-MMA) or glutarimide-methyl methacrylate (Glutarimide-MMA).

The positive biaxial retardation film and/or the resin composition for producing the film can further comprise a retardation regulator in addition to the acrylate resin. The retardation regulator can include a styrene monomer. The retardation regulator can be, for example, styrene-acrylonitrile (SAN).

When styrene is used alone as a retardation regulator, the usability with the acrylate-based resin is not exhibited, but styrene-acrylonitrile (SAN) used together with acrylonitrile is used, whereby the usability with the acrylate-based resin can be sufficient.

In one example, the retardation regulator can be contained in an amount from 15 parts by weight or more, 20 parts by weight or more, or 30 parts by weight or more, to 80 parts by weight or less, or 75 parts by weight or less, relative to 100 parts by weight of the acrylate-based resin. When the retardation regulator is contained in the above content range, it can be advantageous in terms of realizing the flat wavelength dispersion of the retardation film and securing the heat resistance of the retardation film by setting the glass transition temperature of the resin composition for producing the retardation film within the appropriate range.

In one example, the positive biaxial retardation film and/or the resin composition for producing the film can further comprise a triazine-based birefringence regulator in addition to the acrylate-based resin and the retardation regulator. When the triazine-based birefringence regulator is used, it can be more advantageous to realize the flat wavelength dispersibility by utilizing the refractive index difference with the acrylate-based resin.

In one example, the triazine-based birefringence regulator can be contained in an amount from 5 parts by weight or more, 5.5 parts by weight or more, or 6.5 parts by weight or more, to 15 parts by weight or less, 14 parts by weight or less, or 13 parts by weight or less, relative to 100 parts by weight of the acrylate-based resin. When the triazine-based birefringence regulator is contained in the above content range, it can be more suitable for realizing flat wavelength dispersibility in general normal dispersion, where it has an excellent optical characteristic.

In one embodiment of the present application, the triazine-based birefringence regulator can be a 2-hydroxyphenyl-s-triazine derivative, and can include, specifically, Tinuvin 1600, Tinuvin 460, Tinuvin477, Tinuvin479 and Tinuvin1577 from BASF and/or LA-F70 and LA46 from ADEKA, and the like, but is not limited thereto.

In one example, the triazine-based birefringence regulator can be a compound of the following Formula 1:

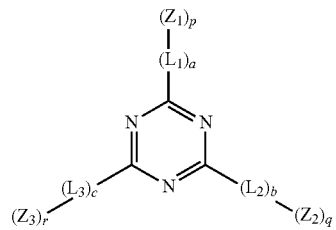

Formula 1

In Formula 1 above, $L_1$ to $L_3$ are the same or different from each other, and are each independently a direct bond, a substituted or unsubstituted arylene group or a substituted or unsubstituted heteroarylene group; $Z_1$ to $Z_3$ are the same or different from each other, and are each independently hydrogen, a hydroxyl group, a substituted or unsubstituted alkoxy group, a substituted or unsubstituted alkyl group, a substituted or unsubstituted aryl group or a substituted or unsubstituted heteroaryl group; a, b and c are the same or different from each other, and are each independently an integer of 1 to 3; p, q and r are the same or different from each other, and are each independently an integer of 1 to 5; and when a, b, c, p, q and r are an integer of 2 or more, two or more substituents in parentheses are the same or different from each other.

Illustrative examples of such substituents are set forth below, but are not limited thereto.

In this specification, the term "substituted or unsubstituted" means that it is substituted or unsubstituted with one or more substituents selected from the group consisting of an alkoxy group; an alkyl group; an aryl group; and a heterocyclic group, or two or more substituents of the above-exemplified substituents are connected to each other to be substituted or unsubstituted. For example, the "substituent to which two or more substituents are connected" can be a biphenyl group. That is, the biphenyl group can be an aryl group, and can be interpreted as a substituent in which two phenyl groups are connected.

In this specification, the alkyl group can be linear or branched, and the number of carbon atoms is not particularly limited, but is preferably 1 to 40. According to one embodiment, the alkyl group has 1 to 20 carbon atoms. According to another embodiment, the alkyl group has 1 to 10 carbon atoms. According to another embodiment, the alkyl group has 1 to 6 carbon atoms. A specific example of the alkyl group includes a methyl group, an ethyl group, a propyl group, an n-propyl group, an isopropyl group, a butyl group, an n-butyl group, an isobutyl group, a tert-butyl group, a sec-butyl group, a 1-methyl-butyl group, a 1-ethyl-butyl group, a pentyl group, an n-pentyl group, an isopentyl group, a neopentyl group, a tert-pentyl group, a hexyl group, an n-hexyl group, a 1-methylpentyl group, a 2-methylpentyl group, a 4-methyl-2-pentyl group, a 3,3-dimethylbutyl group, 2-ethylbutyl group, a heptyl group, an n-heptyl group, a 1-methylhexyl group, a cyclopentylmethyl group, a cyclohexylmethyl group, an octyl group, an n-octyl group, a tert-octyl group, a 1-methylheptyl group, a 2-ethylhexyl group, a 2-propylpentyl group, an n-nonyl group, a 2,2-dimethylheptyl group, a 1-ethyl-propyl group, a 1,1-dimethyl-propyl group, an isohexyl group, a 4-methylhexyl group, a 5-methylhexyl group, and the like, but is not limited thereto.

In this specification, the alkoxy group can be linear, branched or cyclic. The number of carbon atoms of the alkoxy group is not particularly limited, but is preferably 1 to 40. Specifically, it can be methoxy, ethoxy, n-propoxy, isopropoxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but is not limited thereto.

The alkyl group, the alkoxy group and other substituents comprising alkyl group moieties as described herein include both linear and branched forms.

In this specification, the aryl group is not particularly limited, but has preferably 6 to 60 carbon atoms, which can be a monocyclic aryl group or a polycyclic aryl group. According to one embodiment, the aryl group has 6 to 30 carbon atoms. According to one embodiment, the aryl group has 6 to 20 carbon atoms. The aryl group can be a phenyl group, a biphenyl group, a terphenyl group or the like as the monocyclic aryl group, but is not limited thereto. The polycyclic aryl group can be a naphthyl group, an anthracenyl group, a phenanthryl group, a pyrenyl group, a perylenyl group, a triphenyl group, a chrysenyl group, a fluorenyl group or the like, but is not limited thereto.

In this specification, the heterocyclic group is a heterocyclic group containing, as heteroatoms, one or more of N, O, P, S, Si and Se, wherein the number of carbon atoms is not particularly limited, but is preferably 1 to 60. According to one embodiment, the heterocyclic group has 1 to 30 carbon atoms. An example of the heterocyclic group includes a pyridyl group, a pyrrole group, a pyrimidyl group, a pyridazinyl group, a furanyl group, a thiophenyl group, an imidazole group, a pyrazole group, an oxazole group, an isoxazole group, a thiazole group, an isothiazole group, a triazole group, an oxadiazole group, a thiadiazole group, a dithiazole group, a tetrazole group, a pyranyl group, a thiopyranyl group, a pyrazinyl group, an oxazinyl group, a thiazinyl group, a dioxinyl group, a triazinyl group, a tetrazinyl group, a quinolinyl group, an isoquinolinyl group, a quinolyl group, a quinazolinyl group, a quinoxalinyl group, a naphthyridinyl group, a acridinyl group, a xanthenyl group, a phenanthridinyl group, a diazanaphthalenyl group, a triazaindenyl group, an indole group, an indolinyl group, an indolizinyl group, a phthalazinyl group, a pyridopyrimidinyl group, a pyridopyrazinyl group, a pyrazinopyrazinyl group, a benzothiazole group, a benzoxazole group, a benzimidazole group, a benzothiophene group, a benzofuranyl group, a dibenzothiophenyl group, a dibenzofuranyl group, a carbazole group, a benzocarbazole group, a dibenzocarbazole group, an indolocarbazole group, an indenocarbazole group, a phenazinyl group, an imidazopyridine group, a phenoxazinyl group, a phenanthridine group, a phenanthroline group, a phenothiazine group, an imidazopyridine group, an imidazophenanthridine group, a benzoimidazoquinazoline group or a benzoimidazophenanthridine group, and the like, but is not limited thereto.

In this specification, the description of the heterocyclic group as described above can be applied to the heteroaryl group, except that the heteroaryl group is aromatic. In this specification, the description of the aryl group as described above can be applied to the arylene group, except that the arylene group is a divalent group.

In one example, $L_1$ to $L_3$ can be a direct bond, or a substituted or unsubstituted arylene group having 6 to 60 carbon atoms, such as an arylene group having 6 to 40 carbon atoms, for example a perylene group. In one example, $Z_1$ to $Z_3$ can be hydrogen; a hydroxyl group; a substituted or unsubstituted aryl group having 6 to 60 carbon atoms, such as an aryl group having 6 to 40 carbon atoms, for example a phenyl group; or an alkoxy group substituted or unsubstituted with an alkyl group having 1 to 40 carbon atoms, such as an alkoxy group substituted or unsubstituted with a branched alkyl group having 1 to 10 carbon atoms.

In one specific example, the triazine-based birefringence regulator can be a compound, wherein in Formula 1 above, $L_1$ to $L_3$ are each a direct bond and at least one of $Z_1$ to $Z_3$ is a substituted or unsubstituted aryl group. As the triazine-based birefringence regulator having such a structure, Tinuvin 1600 from BASF can be exemplified. In the case where at least one of $Z_1$ to $Z_3$ is a phenyl group, the difference in birefringence is larger than that in other cases, and thus, the compound in which at least one of $Z_1$ to $Z_3$ is a phenyl group can be advantageous in terms of the effect of improving the wavelength dispersibility as compared with other compounds.

The contents and components of the acrylate resin, the styrene monomer-containing retardation regulator and the triazine-based birefringence regulator in the retardation film and/or the resin composition can each be confirmed by nuclear magnetic resonance (NMR) and gas chromatography (GC) analyses.

The resin composition can have a glass transition temperature of 115° C. or higher. The glass transition temperature of the resin composition can be specifically 118° C. or higher, and can be 150° C. or lower, or 130° C. or lower. The glass transition temperature of the resin composition can be controlled within the above range by the acrylate-based resin having a glass transition temperature of 120° C. or higher, and accordingly, the retardation film has excellent heat resistance characteristics.

As described above, the retardation film can be produced by a method of preparing the resin composition, and then film-forming it and stretching it.

The resin composition is prepared by pre-blending the film raw materials with any suitable mixer such as, for example, an omni mixer, and then extruding and kneading the resulting mixture. In this case, the mixer used for the extruding and kneading is not particularly limited, and for example, an extruder such as a single-screw extruder and a twin-screw extruder, or any suitable mixer such as a pressurized kneader can be used.

The film forming method can include, for example, any suitable film forming method such as a solution casting method (solution softening method), a melt extrusion method, a calendering method and a compression molding method. Among these film forming methods, a solution casting method (solution softening method) and a melt extrusion method are preferable.

The solvent used in the solution casting method (solution softening method) can include, for example, aromatic hydrocarbons such as benzene, toluene and xylene; aliphatic hydrocarbons such as cyclohexane and decalin; esters such as ethyl acetate and butyl acetate; ketones such as acetone, methyl ethyl ketone and methyl isobutyl ketone; alcohols such as methanol, ethanol, isopropanol, butanol, isobutanol, methyl cellosolve, ethyl cellosolve and butyl cellosolve; ethers such as tetrahydrofuran and dioxane; halogenated hydrocarbons such as dichloromethane, chloroform and carbon tetrachloride; dimethylformamide; dimethyl sulfoxide, and the like. These solvents can be used alone or in combination of two or more.

The apparatus for carrying out the solution casting method (solution softening method) can include, for example, a drum casting machine, a band casting machine, a spin coater, and the like. On the other hand, the melt extrusion method can include, for example, a T-die method, an inflation method, and the like. The forming temperature can be 150° C. to 350° C., or 200° C. to 300° C.

When a film is formed by the T-die method, a roll shape film can be obtained by mounting a T-die on the tip of a known single-screw extruder or a twin-screw extruder and winding a film extruded in a film shape.

After the film is formed through the above process, the film is stretched. The stretching process can perform longitudinal direction (MD) stretching, transverse direction (TD) stretching, or both. Furthermore, in the case of performing both the longitudinal direction stretching and the transverse direction stretching, any one direction can be first stretched and then the other direction can be stretched, or both directions can be stretched at the same time. The stretching can be performed in one step or in multiple steps. In the case of longitudinal stretching, the stretching by the speed difference between rolls can be performed, and in the case of transverse stretching, a tenter can be used. As the rail start angle of the tenter is usually set within 10 degrees, a bowing phenomenon occurring upon the transverse direction stretching is suppressed and the angle of the optical axis is regularly controlled. Even when the transverse direction stretching is performed in multiple steps, the effect of suppressing the bowing can be obtained.

The stretching temperature is preferably in a range near the glass transition temperature of the resin composition which is the raw material of the film, and when the glass transition temperature of the composition is Tg, it is in the range of, preferably, (Tg−30° C.) to (Tg+100° C.), more preferably, (Tg−20° C.) to (Tg+80° C.), and still more preferably, (Tg−5° C.) to (Tg+20° C.). If the stretching temperature is less than (Tg−30° C.), there is a risk that a sufficient draw ratio may not be obtained. On the contrary, if the stretching temperature is higher than (Tg+100° C.), the flow of the resin composition occurs, whereby there is a risk that stable stretching may not be performed.

In one embodiment of the present application, the draw ratio in the step of stretching the film can also be 1.05 to 10 times based on the length in the stretching direction.

Furthermore, the film can be stretched so that the total draw ratio is from 1.1 times or more, 1.2 times or more, or 1.5 times or more, to 25 times or less, 10 times or less, or 7 times or less, based on the total stretching area. When the draw ratio is less than 1.1 times, the effect of stretching may not be sufficiently achieved, and when the draw ratio is more than 25 times, the film layer can be cracked.

In order to stabilize the optical isotropy and mechanical properties of the retardation film, heat treatment (annealing) or the like can be performed after the stretching treatment. The heat treatment conditions are not particularly limited and any suitable conditions known to those skilled in the art can be adopted.

The liquid crystal polymerized film can comprise a base layer and a liquid crystal layer on one side of the base layer. The contents of the base layer in the antireflection film can be applied to the base layer of the liquid crystal polymerized film in the same manner. Therefore, for the base layer of the liquid crystal polymerized film, a light-transmissive base material can also be used. The liquid crystal layer can comprise a polymerizable liquid crystal compound in a polymerized state. In this specification, the term "polymerizable liquid crystal compound" can mean a compound containing a moiety capable of exhibiting liquid crystallinity, for example, a mesogen skeleton or the like, and also containing one or more polymerizable functional groups. Such polymerizable liquid crystal compounds are variously known under the so-called RM (reactive mesogen). The polymerizable liquid crystal compound can be contained in the polymerized form, that is, the above-described polymerized unit in the cured layer, which can mean a state where the liquid crystal compound is polymerized to form a skeleton such as a main chain or a side chain of the liquid crystal polymer in the cured layer.

The polymerizable liquid crystal compound can be a monofunctional or multifunctional polymerizable liquid crystal compound. Here, the monofunctional polymerizable liquid crystal compound is a compound having one polymerizable functional group, and the multifunctional polymerizable liquid crystal compound can mean a compound containing two or more polymerizable functional groups. In one example, the multifunctional polymerizable liquid crystal compound can comprise 2 to 10, 2 to 8, 2 to 6, 2 to 5, 2 to 4, 2 to 3, two or three polymerizable functional groups.

It is known that a polymerizable liquid crystal composition prepared by compounding such a polymerizable liquid crystal compound, for example, with other components such as an initiator, a stabilizer and/or a non-polymerizable liquid crystal compound is cured in a state oriented on an alignment film to form the cured layer with the developed birefringence. The retardation film having flat dispersion characteristics can be produced by comprising a polymerizable liquid crystal compound having flat dispersion characteristics.

In one example, the negative C plate can comprise a material having a negative retardation value in the thickness direction and high birefringence. The material having a negative retardation value in the thickness direction and high birefringence can be exemplified by a compound containing an aromatic ring or a cycloolefin series in a polymer main chain.

A specific example of the negative C plate can be exemplified by a cellulose ester-based polymer film such as TAC (triacetyl cellulose), a polyarylate film, a polynorbornene film, a polycarbonate film, a polysulfone film, a polyimide film or a copolymer film of two or more monomers among the monomers forming the polymer, and the like.

The polyarylate can comprise a compound of the following Formula 2:

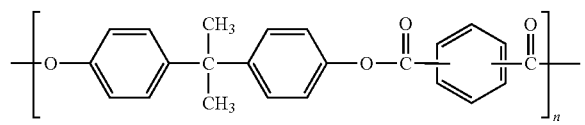

Formula 2 wherein in Formula 2 above, n is an integer of 1 or more.

In one example, the retardation films and the polarizers can be attached to each other via a pressure-sensitive adhesive or an adhesive, or can be laminated to each other by direct coating. An optically transparent pressure-sensitive adhesive or adhesive can be used as the pressure-sensitive adhesive or the adhesive.

In one example, the in-plane switching mode liquid crystal panel can comprise a liquid crystal layer. Also, the in-plane switching mode liquid crystal panel can further comprise an upper substrate and a lower substrate on upper and lower parts of the liquid crystal layer, respectively. The upper substrate and the lower substrate can each be a glass substrate or a plastic substrate. In one example, any one of the upper substrate and the lower substrate can be a color filter substrate, and the other can be a TFT (thin film transistor) substrate. Since the color filter and the TFT can each have an inherent phase difference, a difference in retardation value can occur between the upper substrate and the lower substrate. In one example, the thickness direction retardation (Rth) value of the color filter substrate can be less than 10 nm. In the present invention, the compensation can be performed after passing through the liquid crystal panel by disposing the retardation film between the upper polarizer and the liquid crystal panel, so that the compensation path can be set to the target compensation point at the linearly polarized light position, where it is possible to maximize the effect of improving the contrast ratio in the viewing angle by controlling the positive biaxial retardation film so as to have the flat dispersibility.

The liquid crystal layer can comprise liquid crystals having positive or negative dielectric constant anisotropy. The dielectric constant anisotropy of the liquid crystal layer can be appropriately selected in accordance with the mode of a desired liquid crystal panel. The liquid crystal layer can comprise the liquid crystals in a horizontally oriented state. In one example, the in-plane retardation (Rin) value of the liquid crystal layer can be in a range of 310 nm to 350 nm. The in-plane retardation (Rin) value of the liquid crystal layer can be 310 nm or more, 315 nm or more, 320 nm or more, 325 nm or more, or 330 nm or more, and can be 350 nm or less, 345 nm or less, or 340 nm or less. The thickness direction retardation (Rth) value of the liquid crystal layer can be 0 nm to −40 nm. The liquid crystal layer can have a pretilt angle of, for example, less than 0.2°.

Herein, the pretilt can have an angle and a direction. The pretilt angle can be referred to as a polar angle, and the pretilt direction can be referred to as an azimuthal angle.

The pretilt angle can mean an angle formed by a liquid crystal director with respect to the horizontal surface of the substrate. The pretilt direction can mean a direction that the liquid crystal director is projected on the horizontal surface of the substrate. The pretilt direction can mean the orientation direction of the liquid crystals of the initial state in the liquid crystal layer which is described below.

In this specification, the term "liquid crystal director" can mean a long axis when the liquid crystal has a rod shape and can mean an axis of a normal direction of a disk plane when the liquid crystal has a discotic shape.

The combination of the positive biaxial retardation film and the negative C plate can be suitable for improving the colors and the contrast ratios of the in-plane switching mode liquid crystal panel comprising the liquid crystal layer having the retardation value at the viewing angles.

The upper substrate and the lower substrate of the in-plane switching mode liquid crystal panel can further comprise alignment films on the liquid crystal layer side, respectively. The orientation direction of the liquid crystals can be determined by the alignment film. The alignment film can be a horizontal alignment film. As the alignment film, a rubbing alignment film or a photo alignment film can be used.

In one example, the liquid crystal display device can further comprise a light source adjacent to the lower polarizer as compared to the upper polarizer. In one example, the light source can be included in the liquid crystal display device in a state of being included in a backlight unit. The backlight unit can further comprise a light guide plate for guiding light emitted from the light source, a reflection sheet located on the lower part of the light guide plate, and a diffusion sheet located on the upper part of the light guide plate. The light source generates light, which can be disposed on the side of the light guide plate (edge type). As the light source, various light sources, such as a linear light source lamp, a surface light source lamp, a CCFL or an LED, can be used. A light source cover can be disposed outside the light source. The light guide plate can guide the light generated from the light source to the diffusion sheet. The light guide plate can be omitted when a directly-under type light source is employed, and in this case, a diffusion plate can be further included. The reflection sheet can play a role in reflecting the light generated from the light source and supplying the light toward the diffusion sheet. The diffusion sheet can diffuse and scatter light incident through the light guide plate to supply it to the liquid crystal panel.

In one example, the orientation direction of the liquid crystals in the in-plane switching mode liquid crystal panel (liquid crystal layer) can be parallel to or orthogonal to the absorption axis of the lower polarizer. The orientation direction can mean the orientation direction in an initial state, specifically, a state where no electric field is applied. It can be defined as an O mode liquid crystal panel when the angle is parallel, and it can be defined as an E mode liquid crystal panel when it is orthogonal. In one example, the O mode liquid crystal panel can be preferable from the viewpoint of maximizing the effect of improving the viewing angle contrast ratio.

Advantageous Effects

The present application can provide an in-plane switching mode liquid crystal display device having excellent contrast ratios as well as colors in viewing angles.

BRIEF DESCRIPTION OF DRAWINGS

Figure 1:
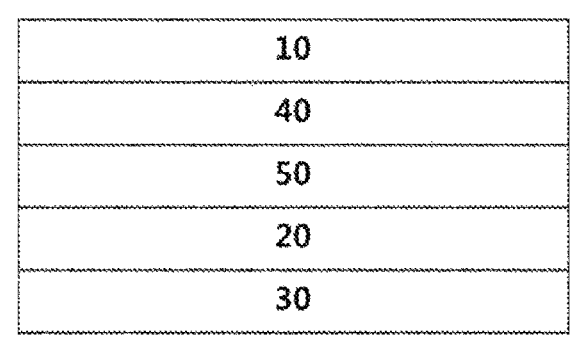

FIG. 1 exemplarily shows a liquid crystal display device of the present application.

DETAILED DESCRIPTION

Hereinafter, the present application will be described in detail by way of examples according to the present application and comparative examples not complying with the present application, but the scope of the present application is not limited by the following examples.

EXAMPLE 1, COMPARATIVE EXAMPLE 1 AND COMPARATIVE EXAMPLE 2

Design conditions of in-plane switching mode liquid crystal display devices are as follows.

1) Liquid crystal panel: an O mode in-plane switching mode liquid crystal panel, having a cell gap (thickness of liquid crystal layer) of 3.4 μm, a pretilt angle of 0.1°, dielectric constant anisotropy Δε>0 of liquid crystals, birefringence Δn=0.1 of liquid crystals at a wavelength of 550 nm, Rin (550) of liquid crystal layer of 330 nm, and Rth (550) of liquid crystal layer of 0 nm 2) Upper polarizing plate: a polarizing plate in which a positive biaxial retardation film (acrylic film) and a negative C plate (TAC-based film) are sequentially formed on one side of a polarizer 3) Lower polarizing plate: a polarizing plate in which an NRT (no retardation TAC) film with a thickness of 60 μm is attached to one side of a polarizer The polarizers of the upper polarizing plate and the lower polarizing plate are PVA (polyvinyl alcohol) polarizers having a degree of polarization of 99.99% or more and single body transmittance of 42.0% for light having a wavelength of 380 nm to 780 nm (measurement equipment: EZ Contrast equipment from Eldim). An in-plane switching mode liquid crystal display device was manufactured by laminating the negative C plate of the upper polarizing plate to be in contact with the liquid crystal panel, and the NRT film of the lower polarizing plate to be in contact with the liquid crystal panel. As the positive biaxial retardation film, a normal wavelength dispersion retardation film was used in Comparative Example 1, a flat wavelength dispersion retardation film was used in Example 1, and a reverse wavelength dispersion retardation film was used in Comparative Example 2. The retardation values of the positive biaxial retardation film and the retardation values of the negative C plate were described in Table 1 below. The retardation value was measured using Axoscan equipment from Axometrics.

Optical Characteristic Evaluation

Figure 2:
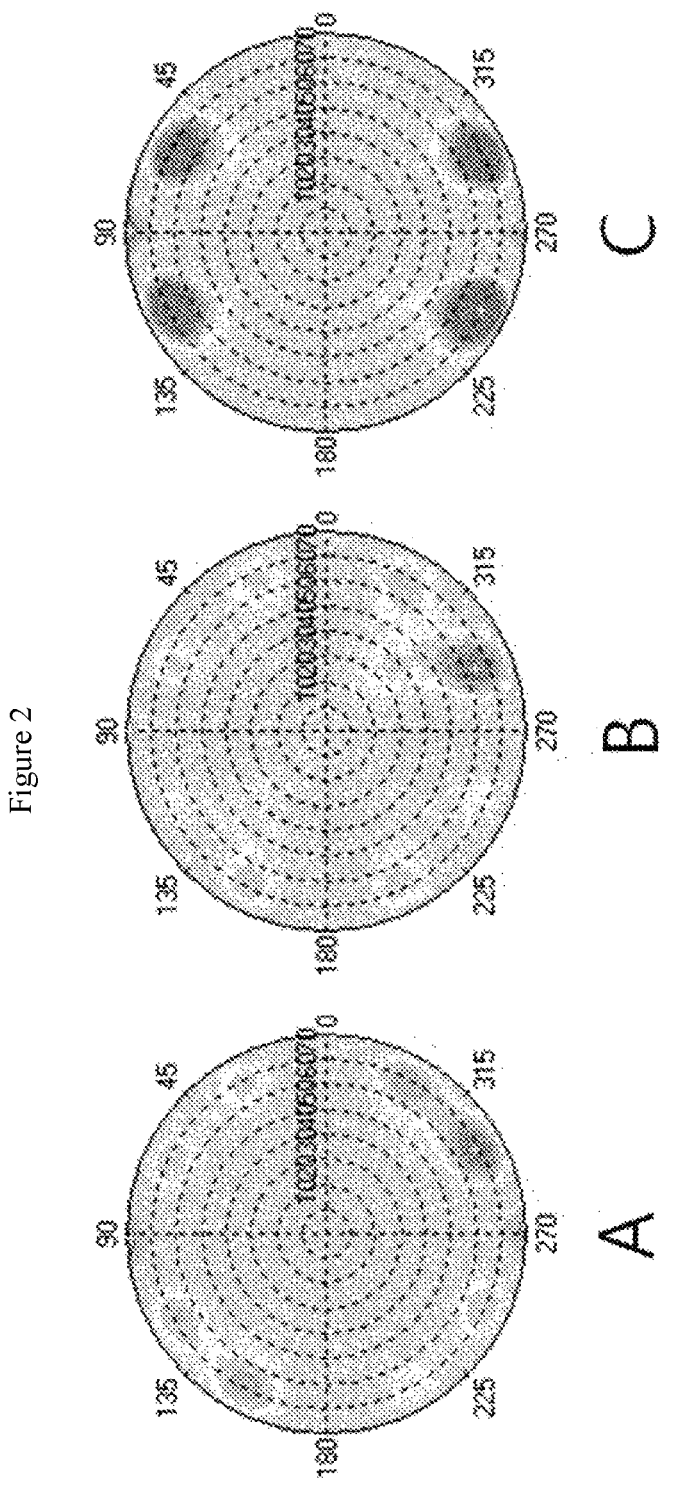
FIGS. 2A-2C are Lb contour measurement results.
Figure 3:
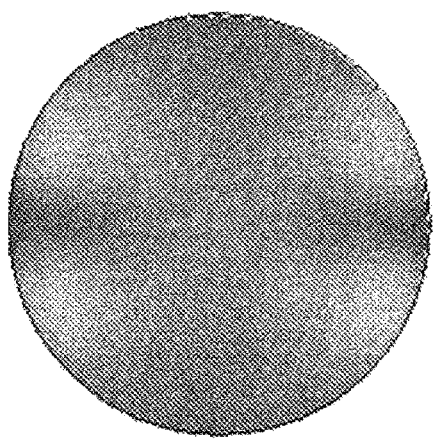
FIGS. 3A-3C are Cb contour measurement results.
Figure 3:
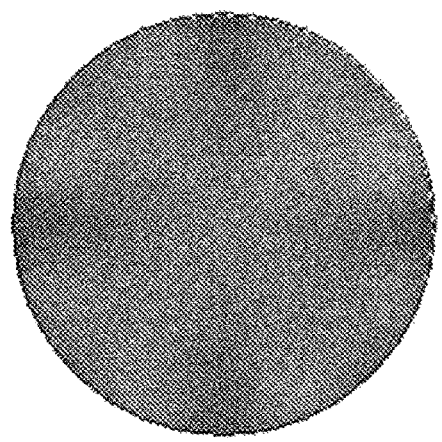
Figure 3:
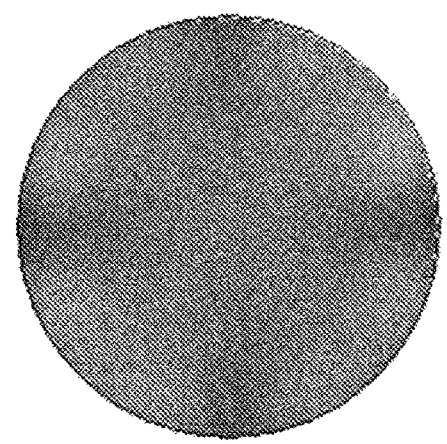

Using an EZ contrast (Eldim) instrument, the optical characteristics were measured for the in-plane switching mode liquid crystal display device. FIGS. 2A-2C are graphs measuring luminance in a black state in all directions (phi: 0° to 360°) according to tilt angles as Lb contours, and FIGS. 3A-3C are graphs measuring visual appreciation in a black state in all directions (phi: 0° to 360°) as Cb contours. Generally, the black state means a state where a black screen is formed when a liquid crystal panel has been driven, and the black state has been realized in a state where a liquid crystal panel is not driven in the optical characteristic evaluation. In Table 1, Lb max means a black luminance value at an azimuth angle indicating the maximum black luminance among the values measuring the black luminance at a tilt angle of 60° in all directions. Since the contrast ratio is defined as the luminance in the white state with respect to the luminance in the black state, it means that the lower the Lb max value, the better the contrast ratio in the viewing angle.

TABLE 1

|  |  | Comparative Example 1 | Example 1 | Comparative Example 2 |
|---|---|---|---|---|
| +B plate | Rin(450)/Rin (550) | 1.07 | 1 | 0.9 |
|  | Rin(650)/Rin (550) | 0.97 | 0.99 | 1.02 |
|  | Rin(550) (nm) | 118 | 118 | 118 |
|  | Rth(550) (nm) | −118 | −118 | −118 |
| −C plate | Rin(550) (nm) | 0 | 0 | 0 |
|  | Rth(550) (nm) | 115 | 115 | 115 |
| Optical characteristic | Lb front | 0.6 | 0.6 | 0.6 |
|  | Lb max (60°, max) | 0.81 | 0.91 | 0.94 |
|  | Cb | Purple + Red | Blue | Blue + Green |

EXPLANATION OF REFERENCE NUMERALS

10: upper polarizer, 20: in-plane switching mode liquid crystal panel, 30: lower polarizer, 40: positive biaxial retardation film 50: negative C plate

The invention claimed is:

1. A liquid crystal display device, comprising, sequentially, an upper polarizer, an in-plane switching mode liquid crystal panel comprising a liquid crystal layer having a Rin (550) value in a range of 310 nm to 350 nm, and a lower polarizer, wherein:
an absorption axis of the upper polarizer and an absorption axis of the lower polarizer are orthogonal;
the lower polarizer is adjacent to a light source as compared to the upper polarizer;
the liquid crystal display device further comprises, as retardation films, a positive biaxial retardation film having a Rin (450)/Rin (550) value in a range of 0.99 to 1.01, and a Rin (650)/Rin (550) value in a range of 0.99 to 1.01, and a negative C plate between the upper polarizer and the in-plane switching mode liquid crystal panel; and
Rin ($\lambda$) is an in-plane retardation value for a wavelength of $\lambda$ nm,
wherein the positive biaxial retardation film satisfies Equation 4:

$$nz \neq nx > ny \qquad \text{Equation 4}$$

wherein nx, ny and nz are the refractive indexes of the retardation film in the x-, y- and z-axis directions, respectively.

2. The liquid crystal display device according to claim 1, wherein the positive biaxial retardation film has an in-plane retardation value of more than 0 nm to 300 nm for light with a wavelength of 550 nm.

3. The liquid crystal display device according to claim 1, wherein the positive biaxial retardation film has a thickness direction retardation value of −300 nm to −40 nm as calculated by the following Equation 2:

$$R\text{th} = \{(nx+ny)/2 - nz\} \times d \qquad \text{Equation 2}$$

wherein:
nx, ny and nz are refractive indexes of the retardation film in x-, y- and z-axis directions, respectively;
d is the thickness of the retardation film;
the x-axis direction is a slow axis direction of the retardation film in the plane direction;
the y-axis direction is a fast axis direction of the retardation film in the plane direction; and
the z-axis direction is the thickness direction of the retardation film.

4. The liquid crystal display device according to claim 1, wherein the positive biaxial retardation film has an Nz value of −1 to less than 1 in the following equation 3:

$$Nz = (nx-nz)/(nx-ny) \qquad \text{Equation 3}$$

wherein:
nx, ny and nz are refractive indexes of the retardation film in x-, y- and z-axis directions, respectively;
the x-axis direction is a slow axis direction of the retardation film in the plane direction;
the y-axis direction is a fast axis direction of the retardation film in the plane direction; and
the z-axis direction is the thickness direction of the retardation film.

5. The liquid crystal display device according to claim 1, wherein a slow axis of the positive biaxial retardation film is parallel to the absorption axis of the upper polarizer.

6. The liquid crystal display device according to claim 1, wherein the positive biaxial retardation film is adjacent to the upper polarizer as compared to the negative C plate.

7. The liquid crystal display device according to claim 1, wherein the negative C plate has a thickness direction retardation value of 40 nm to 130 nm as calculated by the following Equation 2:

$$R\text{th}=\{(nx+ny)/2-nz\}\times d \quad \text{Equation 2}$$

wherein:
nx, ny and nz are refractive indexes of the retardation film in x-, y- and z-axis directions, respectively;
d is the thickness of the retardation film;
the x-axis direction is a slow axis direction of the retardation film in the plane direction;
the y-axis direction is a fast axis direction of the retardation film in the plane direction; and
the z-axis direction is the thickness direction of the retardation film.

8. The liquid crystal display device according to claim 1, wherein the in-plane switching mode liquid crystal panel further comprises an upper substrate and a lower substrate on upper and lower parts of the liquid crystal layer, respectively.

9. The liquid crystal display device according to claim 8, wherein any one of the upper substrate and the lower substrate is a color filter substrate and the other is a TFT (thin film transistor) substrate.

10. The liquid crystal display device according to claim 1, wherein the liquid crystal layer has a thickness direction retardation value of 0 nm to −40 nm as calculated by the following Equation 2:

$$R\text{th}=\{(nx+ny)/2-nz\}\times d \quad \text{Equation 2}$$

wherein:
nx, ny and nz are refractive indexes of the liquid crystal layer in x-, y- and z-axis directions, respectively;
d is the thickness of the liquid crystal layer;
the x-axis direction is a slow axis direction of the liquid crystal layer in the plane direction;
the y-axis direction is a fast axis direction of the liquid crystal layer in the plane direction; and
the z-axis direction is the thickness direction of the liquid crystal layer.

11. The liquid crystal display device according to claim 1, further comprising a light source adjacent to the lower polarizer as compared to the upper polarizer.

12. The liquid crystal display device according to claim 1, wherein the orientation direction of the liquid crystal layer in the in-plane switching mode liquid crystal panel is parallel to the absorption axis of the lower polarizer.

\* \* \* \* \*